July 12, 1938.  H. HASTINGS ET AL  2,123,532
GAUGE CONSTRUCTION
Filed June 11, 1936   3 Sheets-Sheet 2
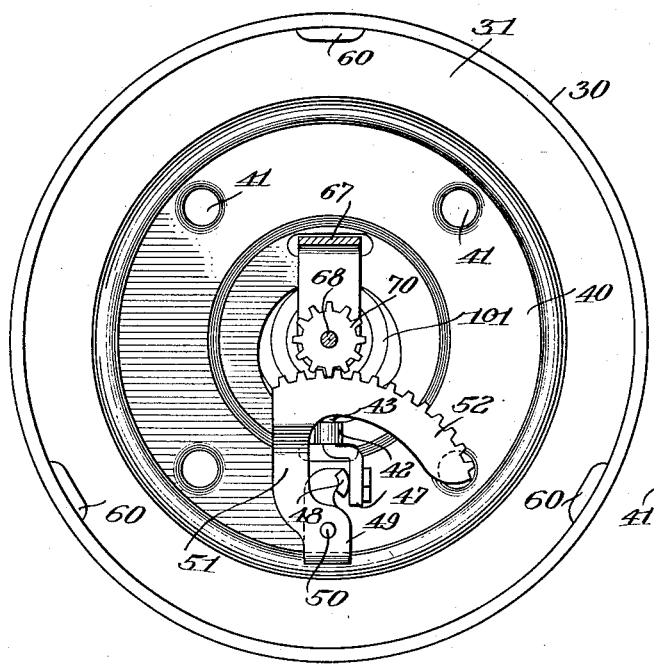
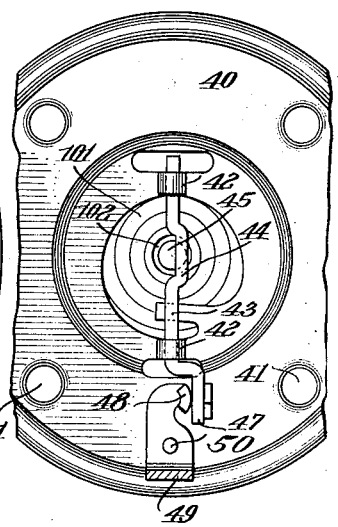
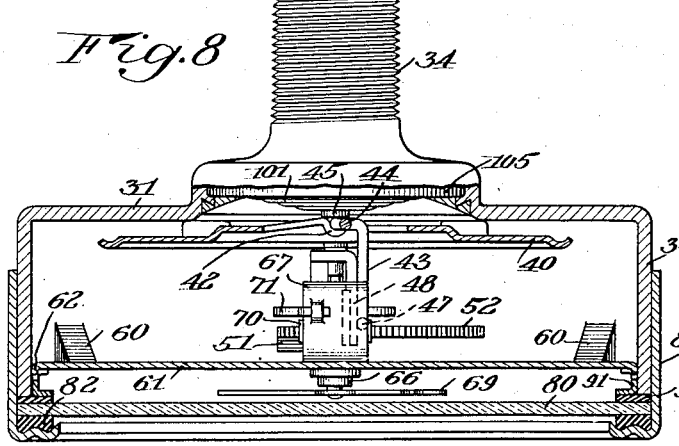
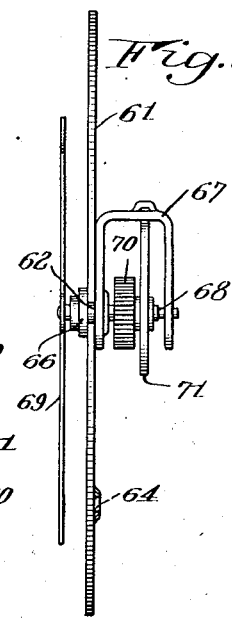
INVENTORS
Herbert Hastings
George E. Ford
BY Cumpston & Shepard
Their ATTORNEYS July 12, 1938.  H. HASTINGS ET AL  2,123,532
GAUGE CONSTRUCTION
Filed June 11, 1936  3 Sheets-Sheet 3
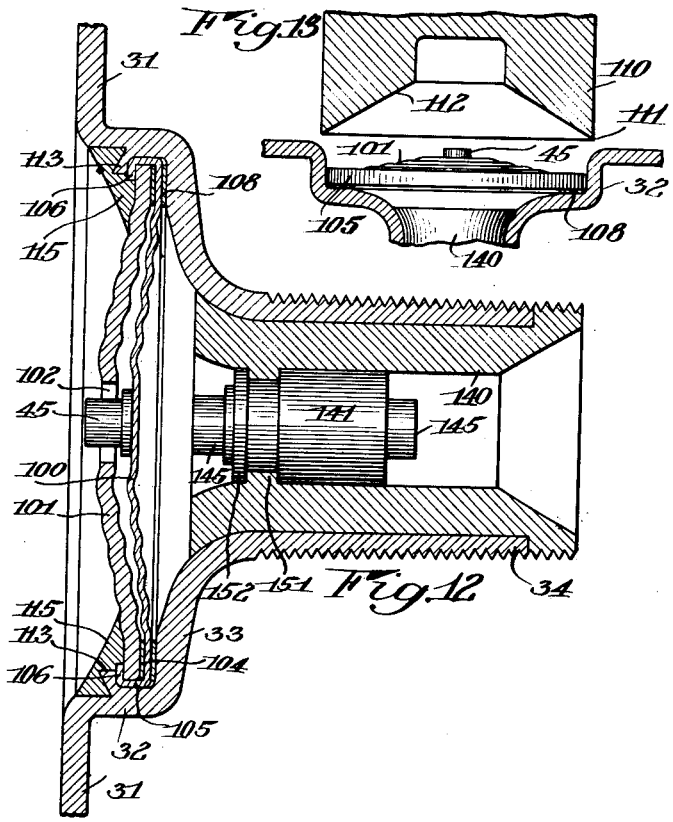
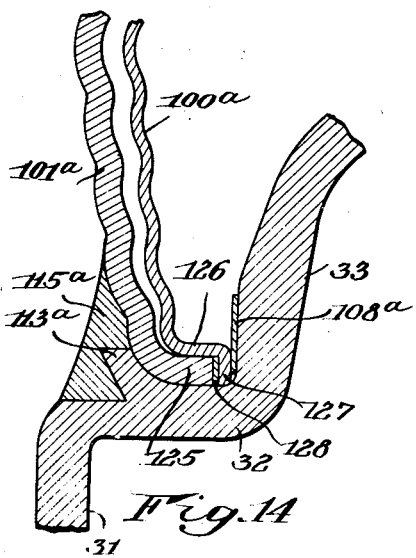
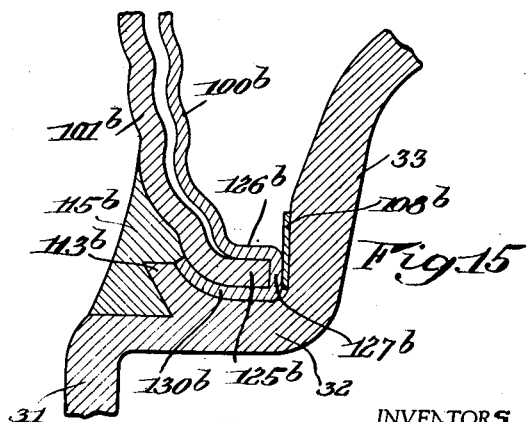
INVENTORS
Herbert Hastings
George E. Ford
BY Cumpston & Shepard
their ATTORNEYS Patented July 12, 1938

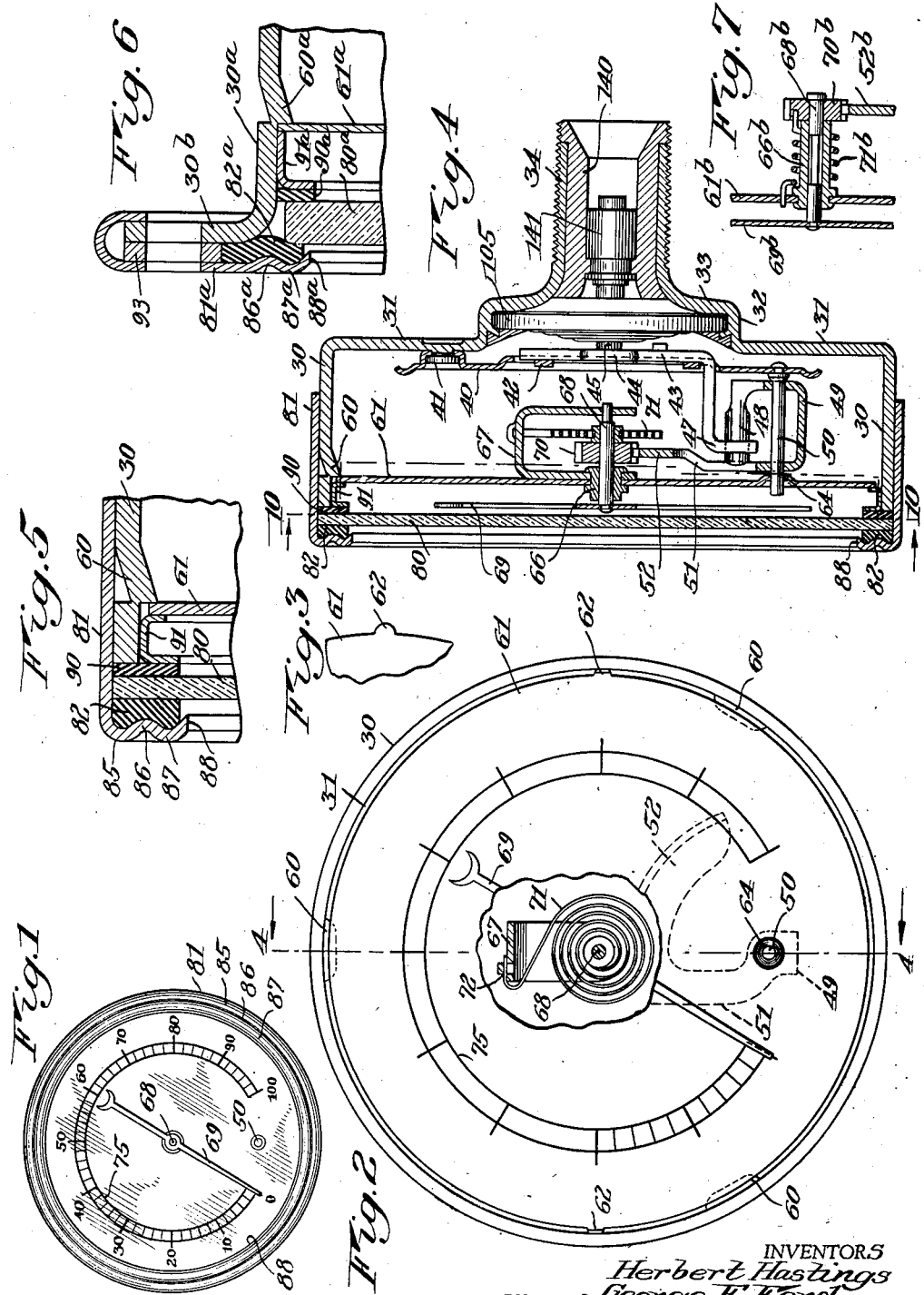

2,123,532

UNITED STATES PATENT OFFICE 2,123,532

GAUGE CONSTRUCTION

Herbert Hastings, Brighton, and George E. Ford, Rochester, N. Y., assignors to Rochester Manufacturing Co., Inc., Rochester, N. Y., a corporation of New York Application June 11, 1936, Serial No. 84,662

10 Claims. (Cl. 73—110)

This invention relates to a gauge, and more particularly to a pressure gauge, although many features of the invention are applicable also to gauges of other types.

An object of the invention is the provision of a generally improved and more satisfactory gauge construction.

Another object is the provision of a gauge which may be constructed economically and quickly, which has few parts, and which is reliable in operation.

A further object is the provision of an improved diaphragm construction, and of improved means for holding the diaphragm in place.

A still further object is the provision of a simplified construction for mounting a needle or pointer, and one which is particularly adapted to a needle or pointer mounted for movement about an axis concentric with the dial of the casing.

To these and other ends the invention resides in certain improvements and combinations of parts, all as will be hereinafter more fully described, the novel features being pointed out in the claims at the end of the specification.

In the drawings:

Figure 1 is a front view of a gauge constructed in accordance with a preferred embodiment of the invention;

Figure 2 is a front view of the gauge on a larger scale with the bezel and glass removed, and with parts of the dial broken away to show the construction beneath.

Figure 3 is an elevation of a fragment of the gauge dial.

Figure 4 is a vertical section through the gauge, the section being taken substantially on the line 4—4 of Figure 2.

Figure 5 is a view similar to a fragment of Fig. 4 illustrating one form of bezel construction on a larger scale than Fig. 4.

Figure 6 is a view similar to Fig. 5 showing a modified form of bezel construction for use on a gauge of the flange type.

Figure 7 is a fragmentary view showing a modification of the needle mounting arrangement of Fig. 4.

Figure 8 is a section through the gauge in a plane at right angles to the plane of Fig. 4.

Figure 9 is an edge view of the dial and needle assembly removed from the casing.

Figure 10 is a section taken substantially on the line 10—10 of Fig. 4.

Figure 11 is a view similar to a fragment of Fig. 10 with parts removed to show the construction beneath.

Figure 12 is a section through the rear end of the gauge showing a preferred form of construction of diaphragm means and holding means therefor.

Figure 13 is a diagrammatic view illustrating the method of making the construction shown in Fig. 12.

Figure 14 is a view similar to a fragment of Fig. 12 showing one modified construction of the diaphragm means.

Figure 15 is a view similar to Fig. 14 showing another modified construction of the diaphragm means.

The same reference numerals throughout the several views indicate the same parts.

The gauge, in its preferred form, includes a casing having a main cylindrical portion 30, which contains the principal operating parts of the gauge. At the rear end of this portion 30 is an annular inwardly extending wall 31 connected to the forward edge of another cylindrical wall portion 32, of smaller diameter and shallower than the portion 30. This cylindrical wall portion 32 is adapted to receive the pressure responsive diaphragm means. At the rear edge of the portion 32 is an inwardly extending flange or wall 33 merging into a stem portion 34 which may be threaded internally or externally as desired, for connection to a conduit, tank or other suitable article subject to the pressure which the gauge is intended to indicate.

Within the main chamber formed by the cylindrical wall 30 is a mounting plate 40 held in place by suitable means such as the studs 41 passing through the plate and integral with the rear wall 31 of the chamber. Struck-up portions 42 of the mounting plate 40 form journals or bearings for a shaft 43 which extends approximately diametrically with relation to the casing 30, as shown in Figs. 10 and 11. Near its middle, the shaft 43 is bent to provide a crank portion 44 which overlies a stud 45 mounted on the pressure responsive diaphragm, which will be described in greater detail below.

As the pressure responsive diaphragm moves in response to pressure variations, the stud 45 moves in a direction axially of the gauge and, by acting upon the crank 44, turns the shaft 43. A larger crank 47 at the lower end of the shaft 43 is thus moved in accordance with the movements of the pressure responsive diaphragm. The crank 47 lies against one side of and transmits its movements to an arm 48 which is formed as an extension of one arm of a generally U-shaped member 49 loosely pivoted on a bearing pin 50 secured to the plate 40. The other arm of this U-shaped member 49 is extended at 51 in a general direction toward the center of the casing 30, and this extension is provided with an arcuate portion 52 having gear teeth concentric with the pivotal axis 50 as shown in Fig. 10. Thus, as the stud 45 of the pressure responsive diaphragm is moved, the motion thereof will be transmitted to the gear segment 52, but the gear segment will have a greatly enlarged extent of motion relatively to that of the stud 45, not only because of the enlarging effect due to the size of the crank arm 47 relatively to the size of the crank 44, but also because of the further enlarging effect due to the distance of the gear segment 52 from the pivot 50 with relation to the distance of the arm 48 from the pivot 50.

At suitable spaced points around the circumference of the cylindrical casing portion 30, cuts are made in the wall 30 and portions of the wall are forced inwardly as indicated at 60, to form ledges or seats on which the dial plate may rest. Three such ledges 60, spaced equally around the circumference of the casing are usually sufficient. The dial plate 61 is made of a diameter slightly less than the internal diameter of the casing portion 30, as shown especially in Fig. 2, except that at two points, approximately on a diameter at right angles to that passing through the pin 50, the dial plate is provided with small points forming extensions or tits 62. The extreme distance from the end of one of these tits 62 to the end of the other is very slightly greater than the internal diameter of the casing portion 30, but the tits 62 are of such small size that they are sufficiently flexible so that as the dial plate 61 is forced axially into the casing the tits will be readily bent over from their initial flat condition indicated in Fig. 3 to the bent condition indicated in Figs. 2 and 8, in which they make tight contact with the inner surface of the casing wall 30.

The dial plate 61 is provided with a hole 64 of the proper size and in the proper location to receive the end of the pin 50 as shown in Fig. 4. In the center of the dial plate a bushing 66 in the form of a hollow rivet extends through the plate and serves to connect the plate firmly to a U-shaped bracket 67. The needle shaft 68 extends through the bushing or hollow rivet and is journaled therein near its forward end, the rear end of the shaft being journaled in the bracket 67 as readily seen from Fig. 4. The front end of the shaft 68 carries the needle or pointer 69. A pinion 70 fixed to the shaft 68 behind the bushing 66 meshes with the gear segment 52, while behind the pinion 70 is a coiled hair spring 71 having one end secured to a hub or collar on the shaft 68, and having its other end secured at 72 to the bracket 67. This hair spring 71 constantly tends, with a very slight force, to rotate the needle in one direction, thus taking up backlash between the pinion 70 and the gear segment 52, and holding the crank 44 always against the stud 45.

It is seen that the needle, the needle shaft, the pinion and the hair spring all form a single unitary assembly mounted on and carried by the dial plate 61, this assembly being shown by itself in Fig. 9. It is easy to mount this assembly in the casing, as it is simply necessary to move the dial plate assembly axially into the casing with the hole 64 in the dial plate alined with the pin 50 so that the pin will enter the hole. The ears or tits 62 bend up or forwardly as the dial plate is shoved rearwardly into the casing. The position of the pin 50 in the hole 64 of the dial plate properly alines the dial plate in a circumferential direction so that the dial plate cannot be placed in an improper circumferential position.

This form of mounting is particularly advantageous in cases where the distance of the pin 50 from the central axis of the gauge casing is likely to vary a little bit due to inaccuracies of manufacture. If the needle shaft 68 and pinion 70 were always mounted exactly at the axial center of the casing, it is apparent that a variation of the pin 50 farther from or closer toward the center would result in too loose or too tight meshing of the gear segment 52 with the pinion 70. With the present form of mounting, however, the position of the needle shaft 68 and pinion 70 is made dependent upon the position of the pin 50, so that wherever this pin may be located, whether a little too far or a little too close to the axial center of the gauge, the shaft 68 will nevertheless always be at exactly the right distance from the pin 50, and the pinion 70 will always mesh to exactly the right extent with the teeth of the gear segment 52. Since the ears or tits 62 on the dial plate are provided on a diameter substantially perpendicular to the diameter passing through the pin 50, they do not prevent slight movement of the dial plate 61 in a direction along the diameter passing through the pin 50, and since the dial plate 61 is of slightly smaller diameter than the casing 30, it may move somewhat along the diameter passing through the pin 50 as may be required in order to position the hole 64 of the dial plate properly on the pin 50 if this pin is not exactly in its intended position.

The dial plate carries, of course, suitable graduations reading in pounds per square inch, or any other desired units of measurements, the scale being graduated concentric with the shaft 68 and, therefore, substantially concentric with the casing 30. Such graduations are shown diagrammatically at 75 in Figs. 1 and 2.

In front of the dial plate 61 and the needle 69, is a transparent plate 80, of glass or other suitable material, the periphery of which may rest upon the front edge of the casing portion 30. The glass may be held in place by a bezel having a cylindrical portion 81 fitting over and surrounding the casing portion 30 and forming a tight press fit therewith if desired, the bezel also having an annular inwardly extending portion overlying the periphery of the glass 80 and serving to retain a washer or gasket 82 in place. Preferably the annular portion of the bezel is shaped as best shown in Fig. 5, having a convex ridge 85 near its outer edge, and then a concave or depressed portion 86 inwardly of the portion 85, and then another convex portion 87 terminating in an edge 88, as shown. The innermost inclined wall or side of the convex portion 87 prevents the gasket 82 from squeezing out between the bezel and the glass in a direction toward the center of the gauge, while the depressed portion 86 produces a firm pressure upon an intermediate part of the gasket 82, thus pressing this part of the gasket firmly against the glass 80, but the relieved portion 87 does not press to any great extent upon the gasket, and thus the gasket is not tightly compressed at a point which is likely to extrude the gasket between the bezel and the glass. A second gasket 90 is preferably placed beneath the glass 80, and a sleeve or spacing ring 91 holds the gasket 90 in place and also maintains the dial plate 61 properly seated against the abutments 60.

The gauge above described has what may be termed a plain cylindrical outer edge. Sometimes it is desired to provide gauges of the flanged type, with outwardly extending annular flanges on their outer edges so that such gauges may be mounted on an instrument board. The same improved principles of construction of the bezel may be employed on a flanged gauge, as shown in Fig. 6. Here, the casing part 30a has an outwardly extending flange 30b. The dial plate is indicated at 61a and the glass at 80a. The bezel 81a has its outer edge turned rearwardly around and embracing the flange 30b of the gauge casing, thus holding the bezel immovably to the casing. As before, there is a gasket 82a, and the bezel has a depression 86a overlying an intermediate portion of the width of the gasket to press this part of the gasket firmly toward the glass 80a, and also has a convex portion or bulge 87a near its inner edge terminating at the inner edge 88a. The convex portion 87a receives the inner edge of the gasket 82a without pressing it so tightly as to cause it to extrude between the bezel and the glass. A second gasket 90a and a sleeve or spacing ring 91a may be employed as before. Another spacing ring 93 may be placed between the bezel 81a and the flange 30b, to prevent the bezel from buckling when mounting screws which pass through the bezel and flange are drawn tight.

Fig. 7 illustrates a modified form of construction for mounting the needle shaft and pinion upon the dial plate. Here, the dial plate is indicated at 61b, the needle at 69b and the needle shaft at 68b. Instead of providing a separate U-shaped bracket 67 to form a bearing for the needle shaft the bushing or hollow rivet 66 itself is made relatively long as indicated at 66b, to form a sufficient bearing for the needle shaft. The pinion 70b, is secured to the shaft just to the rear of the member 66b and meshes with the gear segment 52b, which may be identical with the gear segment 52 previously described. A light coiled spring 71b surrounds the hollow rivet 66b and has one end secured to the pinion 70b while the other end is secured to the dial plate 61b, the spring thus serving to eliminate backlash in the needle driving mechanism.

The diaphragm means in its preferred embodiment may be constructed as best shown in Figs. 12 and 13. The diaphragm means comprises a pressure responsive diaphragm 100 of relatively thin metal, preferably corrugated concentrically to render it more flexible, and a relatively stiff and unyielding guard plate 101 of substantially thicker metal, preferably correspondingly corrugated so that if the diaphragm 100 is subjected to excessive pressure, substantially the entire surface of the diaphragm may come into contact with the guard plate 101 and be supported thereby against rupture due to the excessive pressure. The operating stud 45 above mentioned is secured to and projects forwardly from the front face of the diaphragm 100 at its center, and the guard plate 101 is provided with a central opening 102 through which the stud 45 extends.

A gasket 104 is placed between the diaphragm 100 and the guard plate 101 adjacent their peripheries. This gasket is preferably of a substantially incompressible material, and one of the principal purposes of the gasket is to provide a sharp line of separation between the diaphragm and the guard plate, so that as the diaphragm moves back and forth under the influence of pressure variations the effective diameter of that part of the diaphragm which is subject to movement will remain constant so long as the diaphragm is not subjected to such excessive pressures as will cause it to lie flat against the guard plate. The peripheral edge of the diaphragm 100 may be, and preferably is, bent into cylindrical shape to extend forwardly past the periphery of the guard plate 101, as indicated at 105, and then bent radially inwardly as at 106, thus securely locking together the members 100 and 101 which constitute the diaphragm assembly or diaphragm means. This diaphragm assembly is placed within the small cylindrical chamber formed by the cylindrical wall portion 32 of the casing, and seated against a gasket 108 which lies against the flange 33 and prevents the diaphragm assembly from moving in one direction, that is, in a direction axially backwards. According to the present invention, novel and improved means is provided for holding the diaphragm assembly against movement in the opposite direction, that is in a direction axially forwardly. This improved holding means is formed by the method indicated diagrammatically in Fig. 13 to which reference is now made.

After the diaphragm assembly has been placed within the cylindrical wall portion 32, a tool 110 is alined concentrically with this cylindrical portion 32. The tool 110 has, around its entire periphery, a sharp annular cutting edge 111 of a diameter slightly greater than the external diameter of the diaphragm assembly, or the internal diameter of the cylindrical wall portion 32. This tool 110 may constitute part of a press. The tool is then forced downwardly from the position shown in Fig. 13, so that the sharp cutting edge 111 thereof cuts into the metal of the wall 32 all the way around the periphery of the diaphragm assembly and cuts, in effect, an annular slice from such metal, extending all the way around the periphery of the diaphragm assembly. The inclination of the lower surface 112 of the tool causes this annular slice of metal to be bent inwardly and downwardly upon or onto the periphery of the diaphragm assembly, as indicated at 113 in Fig. 12. The portion 113 remains attached to and forms an integral part of the metal of the wall portion 32, and constitutes an excellent abutment or pressure resisting means for holding the diaphragm assembly properly seated in the casing and preventing forward movement thereof under the influence of pressure on the rear side of the diaphragm. The operation of cutting down the side walls 32 and bending them inwardly over the edge of the diaphragm may be conveniently referred to as a "staking" operation.

Frequently the integral flange or deformed portion 113 provides a sufficient fluid tight seal around the periphery of the diaphragm assembly, but usually it is preferred to employ additional sealing means. This is conveniently in the form of a body 115 of solder, applied in a continuous annular body around the entire periphery of the diaphragm assembly, in a molten state, and usually to an extent sufficient to cover completely the flange 113 and extend a substantial distance axially outwardly along the wall 32 and radially inwardly along the guard plate 101, as readily apparent from Fig. 12. It is found that solder, thus applied in a molten or substantially molten condition and then allowed to solidify, forms an excellent seal at this point and prevents all possibility of fluid leakage past the diaphragm assembly. It is also to be noted that the solder contacts directly with the portion 106 of the diaphragm 100, and thus directly seals the joint between the diaphragm 100 and the casing, so that it does not leak whether or not there is a perfect fluid tight joint between the periphery of the diaphragm 100 and the periphery of the guard plate 101.

An alternative form of diaphragm assembly construction is indicated in Fig. 14, in which the diaphragm is shown at 100a and the guard plate at 101a. Instead of using a gasket 104 between the diaphragm and the guard plate in order to obtain constant working diameter of the diaphragm, the arrangement here employed is to extend the guard plate rearwardly at its periphery to form a cylindrical flange 125, the inner surface of which is substantially truly cylindrical for a material distance. The diaphragm 100a has a similar cylindrical flange 126 fitting within the flange 125 of the guard plate, and may terminate in an annular radial flange 127 spaced from the rear edge of the flange 125 by an interposed gasket 128. The diaphragm 100a is so shaped that it curves away from and leaves the guard plate 101a at a point on the flange 125 where this flange is still truly cylindrical. Thus, notwithstanding flexing of the diaphragm, the effective diameter thereof does not vary, but always remains the same so long as the diaphragm is not subjected to such excessive pressures that it is actually made to lie against the guard plate.

A gasket 108a may be employed between the diaphragm flange 127 and the casing portion 33, and the whole diaphragm assembly may be fastened in place by a staking operation, which forms a flange 113a similar to the flange 113 above-mentioned. A sealing body 115a may be employed, corresponding to the sealing body 115 in the previous embodiment.

In Figure 15 of the drawings there is shown another embodiment similar in general to that indicated in Fig. 14. This embodiment includes a cylindrical flange 125b on the guard plate 101b, and the diaphragm 100b has a cylindrical flange 126b fitting within the flange 125b. As before, the separation between the diaphragm and the guard plate occurs at a point where the flange 125b is cylindrical, so that axial movements of the diaphragm do not result in changes in the effective working diameter thereof.

As 127b the diaphragm is extended radially outwardly past the rear edge of the guard plate flange 125b and then at 130b the diaphragm is bent forwardly along the outer edge of the guard plate 101b, to a point where it will contact with the sealing body 115b. The advantage of this construction over that shown in Fig. 14 is that the sealing body 115b here contacts directly with the metal of the diaphragm itself and seals the diaphragm to the casing, irrespective of any leakage which might occur between the diaphragm and the guard plate. In the construction shown in Fig. 14, however, the sealing means 115a does not come directly into contact with the diaphragm 100a, and if the construction were somewhat defective, leakage might occur around the edge of the diaphragm and into the space between the diaphragm and the guard plate, after which the fluid could easily escape into the gauge through the opening 102 in the guard plate.

In the preferred construction, an adapter sleeve 140 (Figs. 4 and 12) is fixed within the stem 34 of the gauge, and within this sleeve is suitably fixed a second sleeve 141 having a bore therethrough. In the bore is a pressure fluctuation damping means of any suitable construction.

The ends of the sleeve 141 are extended to form relatively thin bendable flanges 145.

The sleeve 141 is preferably sealed tightly within the adapter sleeve 140, if such a sleeve is employed, or tightly within the portion 34, if an adapter sleeve is not used. The adapter sleeve 140, when employed, is sealed tightly within the casing portion 34 so that leakage cannot occur between these parts. The sleeve 141 may have a shoulder which lies against one side of an inwardly extending flange or rim 151 (Fig. 12) on the sleeve 140. On the other side of the flange 151, the metal of the sleeve 141 is deformed outwardly as at 152, by an operation similar to the staking operation above mentioned, to clamp the sleeve 141 firmly within the sleeve 140 and to seal the connection against leakage.

Certain subject matter disclosed but not claimed herein is claimed in our copending patent applications, Serial No. 134,588, filed April 2, 1937, for Gauge damping construction, and Serial No. 135,758, filed April 8, 1937, for Gauge diaphragm mounting.

While certain embodiments of the invention have been disclosed, it is to be understood that the inventive idea may be carried out in a number of ways. This application is, therefore, not to be limited to the precise details described, but is intended to cover all variations and modifications thereof falling within the spirit of the invention and the scope of the appended claims.

We claim:

1. A gauge comprising a hollow casing, a pivot member mounted in said casing, gear segment means mounted for oscillation on said pivot member, a dial plate, a gear mounted on said dial plate for meshing with said segment means, and means on said dial plate cooperating with said pivot member to locate said dial plate in predetermined position relatively to said pivot member to insure proper meshing of said gear with said segment means.

2. A gauge comprising a hollow casing, a pivot member mounted in said casing, gear segment means mounted for oscillation on said pivot member, a dial plate, a gear mounted on said dial plate for meshing with said segment means, and a hole in said dial plate for receiving said pivot member to locate said dial plate in predetermined position relatively to said pivot member to insure proper meshing of said gear with said segment means.

3. A gauge comprising a hollow casing, movable operating means within said casing, a mounting plate in said casing, a shaft journalled on said mounting plate, said shaft having one crank portion cooperating with and operated by said operating means and a second crank portion spaced therefrom, a stud secured to said mounting plate, gear means mounted for oscillation on said stud, said gear means having a portion cooperating with and moved by said second crank portion, other gear means meshing with and driven by said first mentioned gear means, and indicating means connected to and driven by said other gear means.

4. A gauge comprising a hollow casing, a mounting plate within said casing, a stud mounted on said plate, a generally U-shaped member pivotally mounted on said stud, said U-shaped member having one arm extended to form a gear segment portion and having another arm provided with an ear, means contacting with said ear to move said U-shaped member, a dial plate, needle means mounted on said dial plate, and gear means mounted on said dial plate and operatively connected to said needle means and meshing with said gear segment portion to be moved thereby.

5. A gauge comprising a hollow casing having an annular wall, operating gear means within said casing, a stud mounted eccentrically in said casing in definite relation to said gear means, a carrying member mounted within said annular wall and having a limited range of lateral movement relatively thereto, a needle shaft extending through said member, a needle secured to said shaft on the outer side of said member, a pinion secured to said shaft on the inner side of said member and adapted to mesh with said operating gear means, means on said carrying member for engaging said stud to position said carrying member and said pinion in definite relation to said operating gear means in a direction along a diameter passing through said stud, and means on said carrying member for engaging said annular wall to hold said carrying member in definite relation to said casing in a direction transverse to said diameter.

6. A gauge comprising a hollow casing having a substantially circular annular wall, and a dial plate adapted to be placed within and be embraced by said annular wall, said dial plate having a periphery the major portion of which is shaped to be spaced inwardly from said annular wall, and also having a plurality of relatively small ears for engaging the inner surface of said annular wall at spaced points.

7. A gauge comprising a hollow casing having a substantially circular annular wall, and a dial plate adapted to be placed within and be embraced by said annular wall, said dial plate having a periphery the major portion of which is shaped to be spaced inwardly from said annular wall, and also having a plurality of relatively small ears for engaging the inner surface of said annular wall at spaced point, said ears initially extending outwardly to radial extents greater than the radius of said annular wall, and being of readily bendable material adapted to be bent up to lie within said annular wall when said dial plate is pressed forcibly into said casing.

8. A gauge comprising a casing, a pressure responsive diaphragm mounted therein, a guard plate mounted adjacent said diaphragm to limit motion thereof in one direction, said guard plate having a central aperture therein, a stud secured to said diaphragm and projecting through said aperture, gear segment means mounted in said casing for oscillation about an axis substantially removed from said stud, a shaft mounted in said casing, said shaft including two crank portions at a substantial angle to each other, one of said crank portions contacting with said stud to be moved thereby and the other of said crank portions contacting with said gear segment means to move said means, dial means secured to said casing, a needle movably mounted on said dial means, and a pinion also mounted on said dial means and operatively connected to said needle and meshing with said segment means to move said needle in response to movements of said gear segment means.

9. A gauge comprising a metal casing, a pressure responsive diaphragm mounted in said casing, a portion of said casing being deformed into overlying relation to said diaphragm to hold said diaphragm in place within said casing, a pivot member in said casing, gear segment means mounted for oscillation on said pivot member, means operatively connecting said gear segment means to said diaphragm to move said gear segment means in accordance with movements of said diaphragm, a dial plate, a gear mounted on said dial plate for meshing with said segment means, and means in said dial plate cooperating with said pivot member to locate said dial plate in predetermined position relative to said pivot member to insure proper meshing of said gear with said segment means.

10. A gauge comprising a hollow casing having a substantially circular annular wall, a pivot member mounted within said casing, gear segment means mounted for oscillation on said pivot member, a dial plate adapted to be placed within and to be embraced by said annular wall, a gear mounted on said dial plate for meshing with said segment means, said dial plate having a periphery the major portion of which is shaped to be spaced inwardly from said annular wall and having a hole in said dial plate for receiving said pivot member to lock said dial plate in predetermined position relative to said pivot member to insure proper meshing of said gear with said segment means, and a plurality of relatively small ears on the periphery of said dial plate for engaging the inner surface of said annular wall at spaced points, to hold said dial plate against lateral shifting with respect to said annular wall when said dial plate has been properly impaled on said pivot member.

HERBERT HASTINGS.
GEORGE E. FORD.